N. KRUMP.
BAND SAW RECLAIMER.
APPLICATION FILED MAR. 27, 1916.

1,217,095.

Patented Feb. 20, 1917.
3 SHEETS—SHEET 1.

Witness
E.G. Jacker

Inventor:
Nic Krump,
By Charles Turner Brown,
Att'y.

N. KRUMP.
BAND SAW RECLAIMER.
APPLICATION FILED MAR. 27, 1916.

1,217,095.

Patented Feb. 20, 1917.
3 SHEETS—SHEET 2.

Witness
E. G. Jaeker

Inventor:
Nic Krump,
By Charles Turner Brown,
Atty.

N. KRUMP.
BAND SAW RECLAIMER.
APPLICATION FILED MAR. 27, 1916.

1,217,095.

Patented Feb. 20, 1917.
3 SHEETS—SHEET 3.

Witness
E. D. Jacker

Inventor:
Nic Krump,
By Charles Turner Brown,
Atty.

UNITED STATES PATENT OFFICE.

NIC KRUMP, OF CHICAGO, ILLINOIS.

BAND-SAW RECLAIMER.

1,217,095.   Specification of Letters Patent.   Patented Feb. 20, 1917.

Application filed March 27, 1916. Serial No. 87,002.

*To all whom it may concern:*

Be it known that I, NIC KRUMP, a citizen of the United States, and a resident of Chicago, in the county of Cook and State of Illinois, have invented certain new and useful Improvements in Band-Saw Reclaimers for Annealing, Setting, Sizing, and Tempering Used Band-Saws, of which the following, when taken in connection with the drawings accompanying and forming a part hereof, is a specification.

This invention relates to a device to be used to reclaim used band saws.

To those familiar with the art of band sawing metal it is well known that the durability of a band saw is an unknown quantity, due chiefly to the fact that some of the teeth of the saw at times become broken, or bent out of "set" within a very short time after said saw has been put into use and at other times said breaking or bending does not occur for a considerable time after the saw has been put into use. Because of said recited happenings, or other reasons, the kerf of the saw is not straight, that is, the saw does not follow a line, and is rendered useless.

The object of this invention is to obtain means whereby a used saw can be reclaimed, that is, restored to a useful condition, after the same has, for any reason, become useless.

To accomplish the above result I find it necessary to provide means whereby the teeth of the saw which are to be operated upon, will be annealed; means whereby after said teeth have been annealed they will be properly set, and sized; that is, be so set that each tooth will make a kerf of the same width; and means whereby, after said setting and sizing has been accomplished, the "temper" shall be restored to said teeth.

In annealing the teeth which are being operated upon, no considerable part of the band saw, except said teeth is annealed, or re-tempered.

In the reclaiming of a band saw I operate on the teeth individually; and to do this economically I construct a machine which will automatically successively operate on said teeth.

Further I find that when a saw is to be reclaimed, as herein above set forth, even though the teeth of the saw be reground or sharpened before the same is subjected to the process involved in the operation of this machine it becomes necessary that some, and a considerable number of said teeth, shall be re-set; that is, taking an individual tooth which has been set to one side of the body of the band saw, the outer edge of said tooth will be found rounded to a slight extent; and sufficient to prevent clean cutting thereby, and to insure clean cutting by said tooth it should be set on the opposite side of the body of the saw, thereby the outer edge of said tooth will be a sharp cutting edge. By this putting the "set" of a tooth on an opposite side from what it was before being operated upon by this machine, the rounded outer edge will become the inner edge of the tooth and said rounding of the edge ceases to be a detriment to the proper cut of the saw when in use.

I have illustrated a device embodying this invention by means of which the hereinbefore described operation may be properly reduced to practice in the drawings accompanying and forming a part hereof in which, Figure 1, is a side elevation of said device, (but with a setting wheel forming an element thereof removed).

Figure 1:
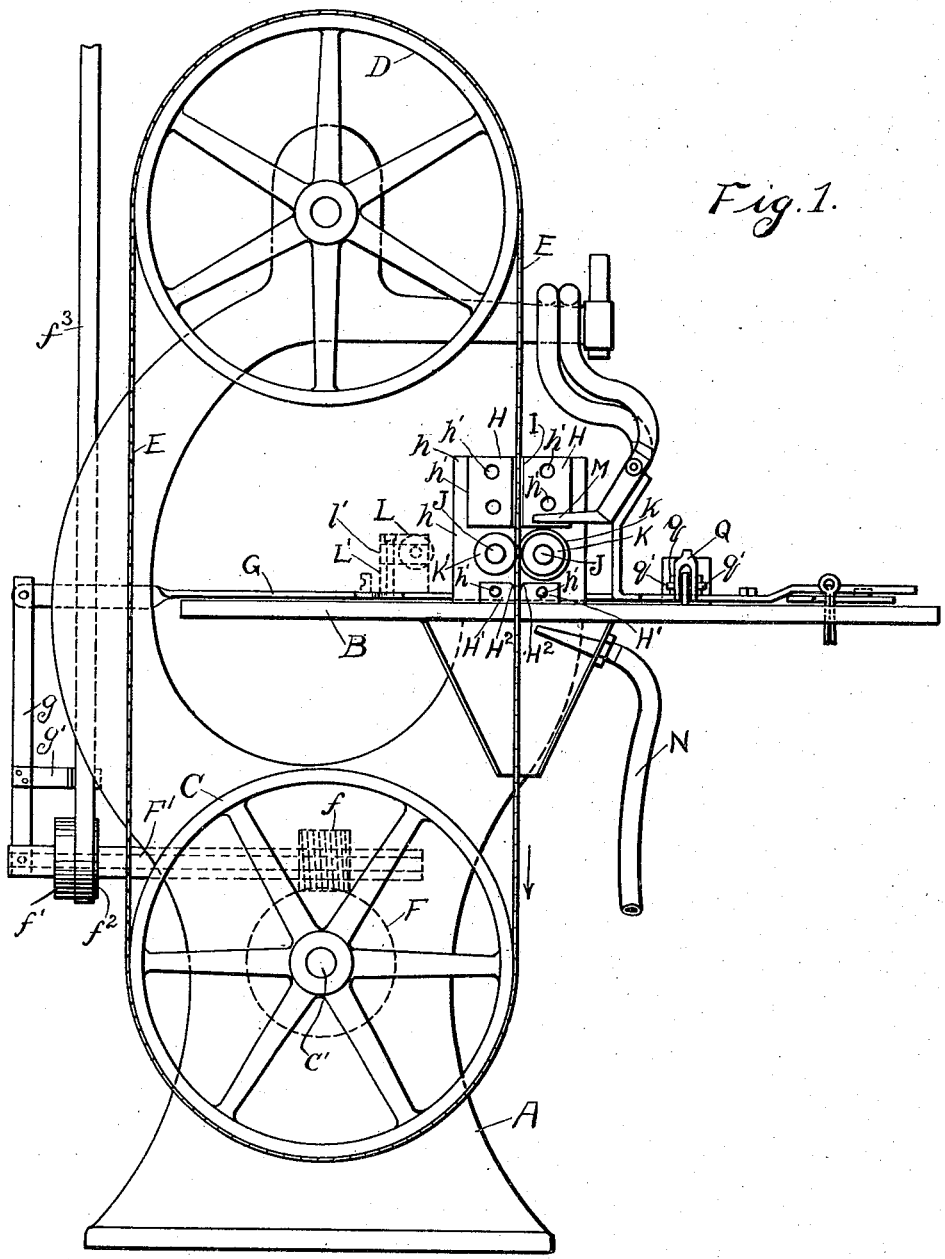

A reference letter applied to designate a given part indicates said part through the several figures of the drawings wherever the same appears.

A, is the frame of the machine illustrated in the drawings and B is the table on said frame.

C and D are wheels rotatably mounted on frame A, and adapted to have band saw E mounted thereon in such manner that continuous rotation of said wheel will continuously move said band saw through the operating members of the machine. C' is the shaft of wheel C. F is a worm wheel rigidly secured to shaft C' (on which wheel C is secured) so that said shaft C', wheel C and worm wheel F turn in unison. f', f², are, respectively, a loose and a tight pulley on shaft F' and f³ is a driving belt adapted to run on said pulleys. G, Fig. 1, is the starting lever of the machine; said starting lever controlling the position of belt f³ by means of the connections g, g', (see Fig. 1).

Figure 2:
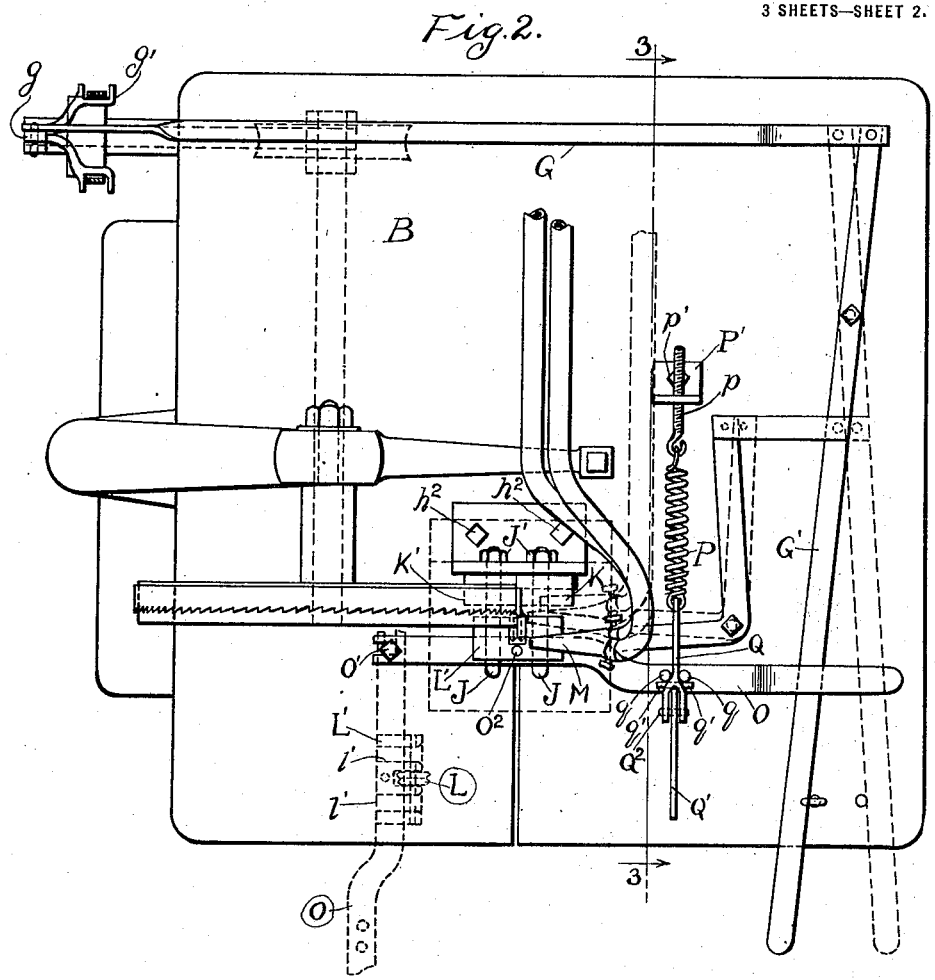
Fig. 2, is a top plan view of the device with said setting wheel in operative position.
Figure 3:
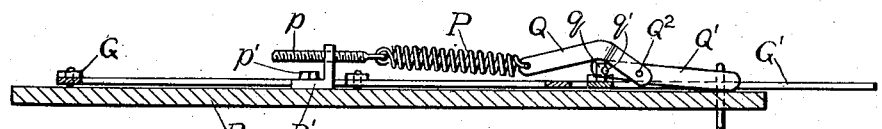
Fig. 3, is a vertical section on line 3—3 of Fig. 2, viewed in the direction indicated by the arrows.

H, H, H', H', are metal blocks which are rigidly secured to table B by means of angle bar or angle iron h. h', h', representing bolts joining blocks H, H' respectively to said angle bar or iron h and h², h², (Fig. 2), representing bolts which secure said angle bar or iron to table B.

The blocks H, H, and also blocks H', H', are in spaced relation to each other to obtain passageways I, I', through which the saw E moves during the operation of the machine. I², Fig. 5, represent bolts in blocks H, H, with which bolts the back or rear edge of the saw E may, at times, come into contact, thus limiting the depth which saw E may be inserted in said passageway I, between said blocks to control the portion of the saw which will be exposed for annealing in the operation of the machine. I³, (Figs. 4 and 5) represents a bolt in blocks H', H', with which the back edge of the saw E may, at times come in contact. The blocks H', H', perform the function of sizing the set of the saw teeth, and for this reason the upper inner corners thereof are rounded, as at H², (Fig. 1), so that if the set of the saw teeth, made as hereinafter described is wider than is desired such set is decreased as the band saw moves downward in the space I', during the operation of the machine. It will be observed on reference to Fig. 5, that blocks H', H', extend forward of the teeth of saw E and observing Fig. 4, the widening of the space I' to a width corresponding with the extreme width (or sizing) of the set of the saw teeth which is desired is indicated by the broken lines I⁴.

J, are bolts respectively provided with shoulder j (see Fig. 5) which are rigidly secured in angle bar h by nuts J' which when turned tightly to place bring shoulder j forcibly against the fact of said angle bar h. K, K', are guiding rollers which are loosely mounted on bolts J, J. The roller K is of two diameters to obtain the shoulder k; and the position of the bolts J, J, is such that the spaced distance between the periphery of the roller k' and the periphery of the part of the roller K of smaller diameter is substantially the same as the thickness of the saw E; so that when said saw passes down between said rollers it is held thereby firmly with the back edge of the saw against shoulder k, while the toothed wheel L sets the teeth (R, R') of said saw. Toothed wheel L is mounted to rotate freely on the shaft or spindle I in block L'. Block L', is provided with the parallel runways l', l', which are circular in cross section, of a size to fit (to slide) on bolts J, J. The runways I' fit over the bolts J to insure the correct position of the toothed wheel L relative to the saw teeth R, R', when said block L' is in position so that the teeth of said wheel L engage with the teeth of the saw to set said teeth.

Figure 4:
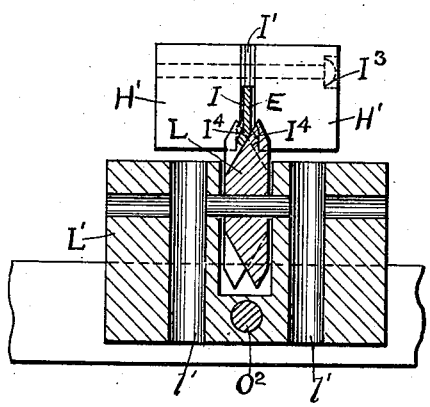
Fig. 4, is a horizontal section on line 4—4 of Fig. 5, viewed in the direction indicated by the arrows, showing said setting wheel in operative position.
Figure 5:
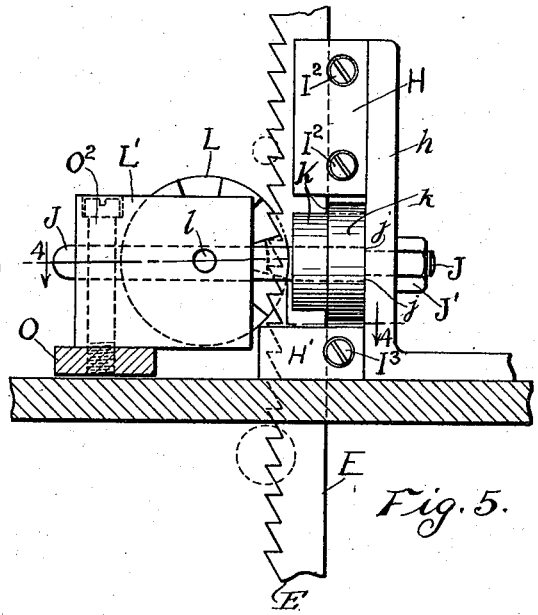
Fig. 5, is an enlarged side elevation of the said setting wheel and coöperating parts.
Figure 6:
Fig. 6, is a face view of a portion of a used saw before the same is reclaimed.
Figure 7:
Fig. 7, is a like view of said saw after the same has been reclaimed by this device.

It will be observed on reference to Fig. 4, that the alternate teeth of wheel L are provided with faces inclined in the opposite direction.

To throw the set of some, but not all, of the teeth of the saw on the opposite side of the body of the saw to which said teeth are set when presented to this machine prior to operation on, I construct the tooth setting wheel L with one or two more, or one or two less, teeth per inch, on the pitch line of said wheel L, than are contained in a running inch of the saw. When so constructed the toothed wheel will jump or skip, a tooth of the saw at regular intervals and some of said teeth, will be oppositely set, as above set forth, while a given number will retain the original set thereof.

M, Fig. 1, is the nozzle of an oxy-hydro torch, so called. This nozzle M directs a flame, on to the teeth R, R' of the continuously moving saw while the body part of said saw is in the passageway I and hence the body part of said saw is not heated to any considerable extent, while said teeth are heated sufficiently to anneal the same. Said annealing is done so closely to the engagement of the body of the saw with the rollers K, K', the engagement of the toothed wheel L with the teeth of said saw, and the movement of the saw through passageway L', that said teeth are at a high temperature during the time of the setting of the teeth in wheel L, and the travel of said saw through the passageway I, I', between blocks H, H and H', H'.

N is the nozzle of a source of liquid supply which is adjusted to direct a flow of liquid from said nozzle on to the said saw teeth; and the temperature of the liquid from said nozzle N is of suitable temperature to properly temper said teeth. I use water as the liquid to be discharged from nozzle N.

O is a lever which turns pivotally on bolt

O' and the block L' is attached to said lever O by pin O². The block L is retracted from and presented to an operative position by means of said lever O, said block being accurately guided to proper position, as hereinbefore set forth, by being slidably mounted on bolts J, J.

P, is a spring one end of which is adjustably attached to the table B, by means of screw threaded bolt $p$ which fits a correspondingly screw threaded aperture in the to size said set of said teeth and means to temper said teeth after the setting thereof, and before the same are cooled.

3. In a band saw reclaiming machine, a frame, wheels adapted to carry a band saw rotatably mounted in said frame, means to turn one of said wheels, a table on said frame, spaced blocks attached to said table to form a runway between said blocks, means to limit the depth of said runway to expose the teeth of a band saw therein and rotatably mounted on said shafts, one of said rollers provided with a shoulder adapted to fit against the back of said band saw, a movable block provided with apertures adapted to loosely fit said shafts of said rollers, means to control the position of said block, a toothed wheel loosely mounted on a shaft in said block, additional spaced blocks positioned so that said teeth move between them to size the set thereof, and means to direct a flow of liquid against said teeth, after the same are sized.

NIC KRUMP.

Witnesses:
CHARLES TURNER BROWN,
W. H. DRUS.

Copies of this patent may be obtained for five cents each, by addressing the "Commissioner of Patents, Washington, D. C."